H. L. FRAILEY.
Mowing Machine.
No. 51,301.                                         Patented Dec. 5, 1865.
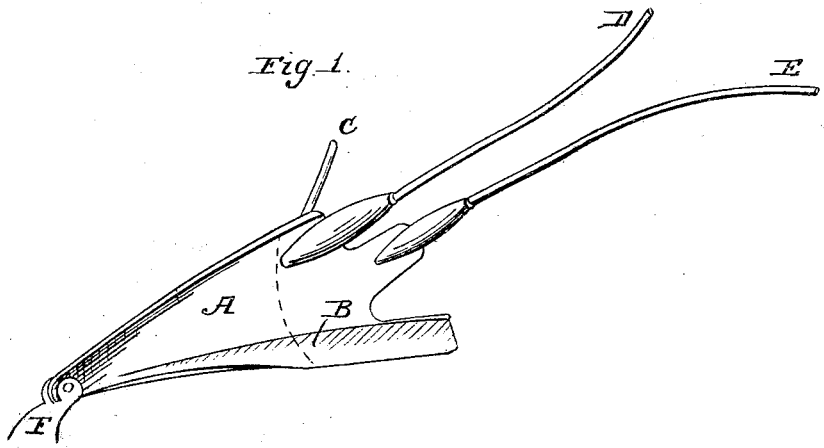
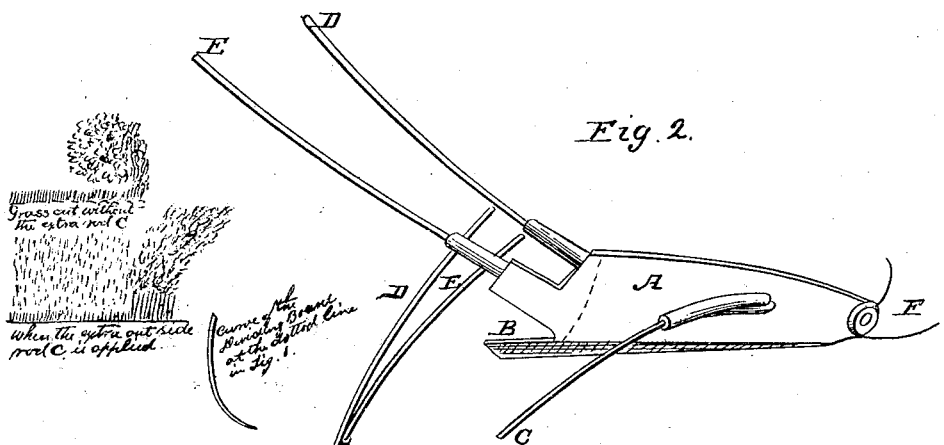
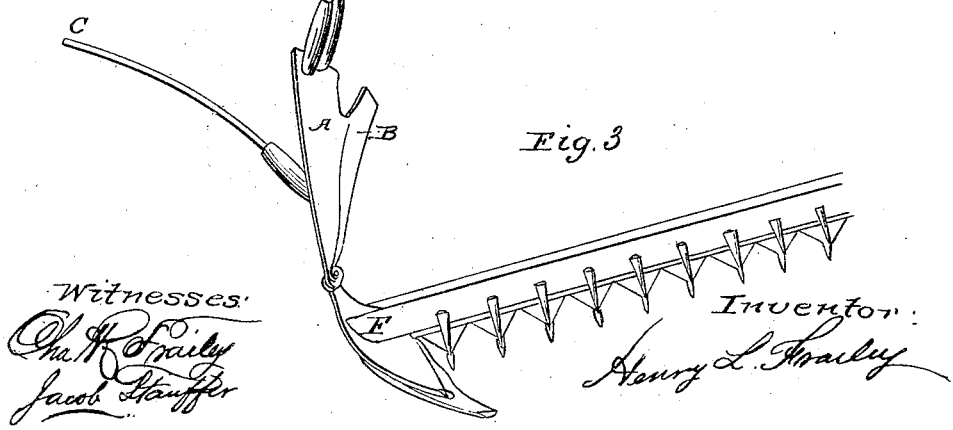
Witnesses:
Cha. W. Frailey
Jacob Stauffer
Inventor:
Henry L. Frailey

UNITED STATES PATENT OFFICE.

HENRY L. FRAILEY, OF LANCASTER, PENNSYLVANIA.

IMPROVEMENT IN MOWING-MACHINES.

Specification forming part of Letters Patent No. 51,301, dated December 5, 1865.

*To all whom it may concern:*

Be it known that I, HENRY L. FRAILEY, of the city of Lancaster, in the county of Lancaster and State of Pennsylvania, have invented a new and useful Improvement on the Dividing-Boards of Mowing-Machines; and I do hereby declare that the following is a full, clear, and exact description of the construction and operation of the same, reference being had to the annexed drawings, making a part of this specification, in which—

Figure 1 is an inside view of the dividing-board with my improvement shown by B C. Fig. 2 shows the outside of the dividing-board with B C. Fig. 3 is a perspective view from the front with the cutter-bar and sickles shown, together with my improved additional outside rod, C, and curved bevel base B.

The construction of my dividing-board differs from those in use by having the lower edge turned in, in order to form a continuous curve somewhat like a mold-board on plows A B, in order to aid the rod or rods D E usually employed and placed on the inside of the dividing-board, and in the rear of the same, as shown, for the purpose of turning the cut grass away from the standing grass. By giving the dividing-board the convexity shown, with its lower edge, B, beveled, a much greater efficiency is acquired by means of its capacity to operate from the ground upward, and more effectually accomplishing the object of the ordinary rods D E alone.

When grass is lodged it usually hangs over, say, six inches or more, upon the track cut by the machine. The consequence is that these six inches or more so hidden and the full width of track not seen is a loss of that much each round of the machine, unless you cut into the overhanging grass, with their tops down, calculated to choke the knives or sickles and greatly retard the mowing, especially in heavy grass, whether much lodged or not, as experience has shown. To remedy this evil, I add an additional rod, C, to the outside of the dividing-board. This rod may be straight or curved, of wood or iron, fixed into a socket made adjustable or otherwise applied to the upper anterior portion, for the purpose of clearing the track already cut, as it lifts the overhanging grass and throws it back, so as to bring the stems of the standing grass into full view, with its heads or tops now lodged on the other standing grass, fully exposing their contact with the soil or forming a clean or clear track for the machine, enabling the driver to cut up to the line of standing grass the full width of the machine, thereby gaining ground, as well as preventing the liability to choking or clogging the sickles or cutters.

I do not claim the dividing-board nor the inside rod or rods, D E, for these are not new.

What I claim as my invention, and desire to secure by Letters Patent, is—

The adjustable outside rod, C, in combination with the curved dividing mold-board, constructed and operating in the manner and for the purpose specified.

HENRY L. FRAILEY.

Witnesses at signing:
CHAS. R. FRAILEY,
JACOB STAUFFER.